United States Patent [19]

Albert et al.

[11] 4,026,478

[45] May 31, 1977

[54] PROCESS FOR MAKING UNIFORM SHORT NON-CELLULOSIC FIBERS

[75] Inventors: Frank D. Albert, Clearwater; Alan P. Conroy, Tampa; David L. Skinner, St. Petersburg, all of Fla.

[73] Assignee: Jim Walter Corporation, Tampa, Fla.

[22] Filed: Apr. 3, 1975

[21] Appl. No.: 564,731

[52] U.S. Cl. .................... 241/24; 241/28; 241/261.2; 65/2; 65/10

[51] Int. Cl.² ................... B02C 23/10; C03B 37/00

[58] Field of Search ............... 65/4 R, 5, 6, 7, 10; 428/87, 92; 241/28, 30, 261.2, 261.3, 24

[56] References Cited

UNITED STATES PATENTS

| 2,083,132 | 6/1937 | Williams | 65/3 R X |
|---|---|---|---|
| 2,206,060 | 7/1940 | Slayter | 65/5 |
| 2,255,071 | 9/1941 | Marco | 241/261.3 |
| 2,587,710 | 3/1952 | Downey | 65/6 |
| 2,646,593 | 7/1953 | Downey | 65/10 X |
| 3,257,182 | 5/1966 | Nystrom | 65/6 |
| 3,308,945 | 3/1967 | Oja | 65/10 X |
| 3,615,009 | 10/1971 | Norton | 209/139 A |

FOREIGN PATENTS OR APPLICATIONS 1,251,641  10/1971  United Kingdom

Primary Examiner—Robert L. Lindsay, Jr.
Attorney, Agent, or Firm—James W. Grace

[57] ABSTRACT

The present invention concerns a novel method of making short inorganic glass fibers and mineral wool fibers with a very low shot content and the fibers thus produced.

3 Claims, No Drawings

PROCESS FOR MAKING UNIFORM SHORT NON-CELLULOSIC FIBERS

BACKGROUND OF THE INVENTION

1. Field of the Invention

This invention is directed to the manufacture of very short inorganic glass fibers and mineral wool fibers with low shot content in a controlled range of aspect ratios. Aspect ratio may be defined as the ratio of fiber length to fiber diameter and is expressed as a dimensionless number. Shot is generally formed from cooled slag which has failed to be fully attenuated in the mineral wool manufacturing process. The short glass or mineral wool fibers can be used as reinforcing agents in plastics.

2. Description of the Prior Art

Mineral wool fibers have been manufactured for a long time and are well known in the art. There are two commercial methods in current use for making mineral wool fibers. One of these methods is performed on an apparatus which uses a single dish-shaped rotor with steam attenuation to form the fibers. The rotor may be in a vertical or horizontal plane. Typical apparatus of this type is shown in the following U.S. Patents: No. 3,022,538, issued on Feb. 27, 1962 to C. B. Setterberg, No. 2,328,714, issued on Sept. 7, 1943 to D. C. Drill, and No. 2,944,284, issued on July 12, 1960 to W. T. Tillotson et al. The other convention method uses multiple rotors which hurl a molten stream of liquid melt against their outer rims in sequence to form the mineral wool fibers. Typical apparatus of this type is shown in the following U.S. Patents: No. 3,045,279 - W. K. Hesse, issued July 24, 1962; No. 2,991,499 - H. E. Holcomb, issued July 11, 1961, and No. 2,561,843 - J. E. Coleman, issued July 24, 1941.

It should be noted that while some of these patents disclose apparatus for separating shot from fibers, none of them disclose a method of producing a very short mineral wool fiber. Rather the teachings of disclosures are directly opposed to that of shortening the fiber. Generally, these fibers are used in the form of long fibers which can be intertwined to form a nonwoven mat or held together by a binder to form a rigid board. Under these prior art conditions, it is desirable to have the fibers relatively long.

More particularly, mineral wool fibers have heretofore been used as heat insulation material in paper-enclosed batts, as reinforcing agents in spray-on heat insulation, or as fibers in rigid acoustical panels and tiles. For all of these applications, there is no need to shorten the length of the fibers as they are formed. In fact, it is generally preferred that the fibers be as long as possible with a large aspect ratio.

In many applications, efforts have been made to separate shot from mineral wool fibers.

Conventionally an air elutriation method is used to separate shot from fibers. This method usually has a stream of air which moves the fibers in an upward arc. It is well known that the shot particles have a much higher weight-to-length ratio than the fibers which are generally long and slender. The air stream not only separates the shot from the fibers because of the difference in response of the shot and the fibers but the air also, to some extend, breaks some of the shot away from the fibers to which it is attached.

In addition, the fibers and shot may be separated by using water as the separating medium. However, this latter method requires an additional drying step which makes the process less attractive than air elutriation.

The method of producing long glass fibers from a molten mass has long been known. Generally, a mass of glass marbles are melted in a heating unit and fine filaments of glass are extruded through small holes in the bottom of the heating unit. These filaments are then collected on spools or in an unwoven mat. Often the filaments are accumulated into bundles which are held together by a binder to give added strength. It is also known to cut or chop the fibers into shorter lengths.

It has also long been known to use defibrating or refining apparatus for reducing wood or cellulosic chips to individual fibers. In the defibrating or refining apparatus, wood chips are rubbed against one another until the result is a mass of long individual cellulose fibers which then can be felted into paper or fiberboard. However, in the process, it is desirable to keep the fibers as long as practicable, as very short fibers are useless for making paper or fiberboard.

SUMMARY OF THE INVENTION

The present invention is directed to a novel process in which inorganic glass or mineral wool fibers are shortened to within a limited range of lengths in a continuous process.

It is an object of the present invention to provide a novel method for separating shot from mineral wool fibers.

It is another object of the present invention to provide a novel method for making glass or mineral wool fibers within a relatively narrow range of aspect ratios.

It is yet another object of the present invention to provide a novel method for making mineral wool fibers with a minimum of shot in a continuous process.

DETAILED DESCRIPTION OF THE INVENTION

The novel process of the present invention may be described with reference to known machinery with, in some instances, novel applications of the known machinery.

For purposes of illustration, the invention will be described in terms of mineral wool fibers although it can be used for reduction of glass fiber also. The known machinery comprises a mineral wool manufacturing facility such as those disclosed in the above cited patents. The mineral wool fibers and associated shot are then placed into a refiner so that the individual fibers are separated from their attached shot and the fibers are reduced in length to a range of shorter fibers within a narrow range of aspect ratios. Following the refining step, the mass of shortened fibers and shot are put through an air classifier where the shot is separated from the fiber and the useful short fibers are removed for packing. The shot is then also packaged and, if desired, can be recycled as part of the starting material for mineral fiber production.

For purposes of this invention it will be assumed that the mineral wool fibers have been made using the multiple rotating disc apparatus shown in the Holcomb patent. The fibers are of multiple lengths with a general distribution of from about 0.5 inches to 36 inches. The shot content was from approximately 25 to 50% of the total weight of the combined shot and fibers. Some of the shot will be individual particles, and some will still be attached to the end of the fibers. In the material investigated, the average diameter of the mineral wool fiber was 5 microns with a distribution of diameters from 1 micron to 15 microns. The aspect ratios of the unrefined mineral wool fibers varied from about $10^3$ to $10^6$. While the fibers are individualized, they nonetheless are in the form of a tangled, unwoven mat or mass of fibers.

The mineral wool fibers thus described were sent through a refiner. For convenience the conventional refiner used was one manufactured and sold by Sprout-Waldron Company, Type No. L9479, Design B. A Sprout-Waldron refiner is well known in the cellulose fiber field, although its use in mineral wool fiber field is new. The Sprout-Waldron refiner consists of a chamber with a central infeed opening having a fixed plate and a rotatable plate. The plates are generally circular in shape and have facing ribs. The plates can be adjusted relative to each other so as to establish a fixed distance or gap between their faces. A suitable power source is connected to rotatable plate to impart rotation thereto.

As is well known, the mass of fibers and shot are introduced into one end of the refiner and are moved in a spiral path from the center of the facing plates to the outer edge of the plates by the relative rotation of one plate with respect to the other. The fibers and shot are moved outwardly until the fibers emerge in shortened form at the output end of the refiner and the shot emerges relatively unaffected. Other types of disc or plug refiners may also be used. A plug refiner has a conical plug and complementary outer shell configuration and the fibers are moved with a forward linear force component in a rotating helical fashion from input to output.

The feature to be here emphasized is the fact that there is a continuous process for reducing the length of the fiber and removing the shot therefrom.

In the case of the invention, the gap was varied from almost entirely closed to an opening of about 0.140 inches or 3556 microns. The following table I shows the relationship between the gap opening, the aspect ration, and the percent of shot passing through a 30 mesh (U.S. Sieve) screen. The table shows the effect of two different feed rates for the mineral wool fiber into the Sprout-Waldron refiner.

Table I

| Aspect Ratio vs. Plate Gap | | |
|---|---|---|
| 1 lbs./Sec. Feedrate | | |
| Gap (inches) | Aspect Ratio (L/D) | Weight % Shot (Passing a 30-Mesh Screen) |
| .010 | 42 | 28 |
| .020 | 43 | 32 |
| .040 | 44 | 25 |
| .050 | 48 | 32 |
| .065 | 64 | 32 |
| .070 | 68 | 31 |
| .100 | 75 | 33 |
| 2 lbs./Sec. Feedrate | | |
| .030 | 31 | 25 |
| .055 | 48 | 34 |
| .070 | 71 | 38 |
| .090 | 80 | 39 |
| .100 | 100 | 37 |
| .130 | 142 | 38 |

From this table, it can be seen that there is a direct relationship between the aspect-ratio and the size of the gap opening.

The amount of shot passing a 30-mesh screen as a percent by weight of the sample is relatively constant despite gap size opening.

It is thus seen that for a desired aspect ratio of mineral fibers, a refiner can be prepared with a fixed gap opening and the fibers fed through the refiner in a continuous manner.

There is a relationship between the feed rate of the mineral wool fiber into the refiner and the aspect ratio of the fibers for a given gap size. It has been found that gap size significantly larger than those shown will not be effective in reducing fiber length.

While applicants don't wish to be held to any scientific explanation for the action in the refiner, it appears that there are two actions involved. The shot is broken away from the ends of the fibers so that almost all of the shot is reduced to individual particles and the fibers are shortened by the action of the refiner. It is felt that the refiner does not act in the manner of a chopper or guillotine, but rather causes the brittle fibers to break against each other much in the manner that strands of thin, dry spaghetti will break if forced against each other. The average length of the fiber is in the order of about 1/5 that of the gap size.

While a Sprout-Waldron refiner has been used as the device to break the shot away from the fiber and to reduce the fiber length to a narrow range of aspect ratios, the actual separation of shot and fibers may be accomplished by using an air classifier. An air classifier capable of proper separation is described in U.S. Pat. No. 3,615,009, issued on Oct. 26, 1971 of which Walter J. Norton is the inventor. This is commercially available from The Georgia Marble Company of Atlanta, Georgia. The air classifier is designed so that an airstream is recirculated through the system to separate finer particles from coarser ones. The finer particles are drawn through a particle separator which allows fine particles to pass through while rejecting coarse particles. There is a centrifugal separator into which the finer particles are drawn with the stream of air and these particles are removed from the system. The air classifier can be easily adjusted to accept particles of a given range of sizes and reject longer and smaller ones. In this device the mineral wool fibers which have a large aspect ratio are separated from the shot, and the shot content drops to below 1% by weight compared to the 25 to 50% in the mineral wool, as formed.

While the Georgia Marble air sifter has been found to be most acceptable, other air separators which are capable of separating particles of different aspect ratios can be used. Air elutriation is a known method of separating particles of different weight to surface ratios. Obviously, the weight to surface ratio of generally round particles is vastly different from that of particles having a much larger aspect ratio (length to diameter). Thus the type of separator is not critical to this invention. However, a suitable separator must be selected to accomplish the separation.

While the emphasis of the invention thus far has been the separation of shot from mineral wool fibers and the breaking of the fibers into shorter lengths, the concept of breaking fibers can be applied also to such brittle fibers as glass fibers. It has been found that glass fibers can be broken into shorter lengths and have a narrow range of aspect ratios when subjected to the process of the present invention. Even a glass fiber mat often has between about 7% to 14% of shot, as commercially produced.

In summary, the invention pertains to a novel process for treating glass or mineral wool fibers to create short fibers within a limited range of aspect ratios.

We claim:

1. The method of producing inorganic fibers within a preselected narrow range of aspect ratios from about 30 to about 140 comprising the steps of making a mass of individual, inorganic fibers having diameters within a prescribed range and having a range of aspect ratios substantially from $10^3$ to $10^6$, said mass further having not less than about 7% shot by weight; putting said mass of fibers through a refiner, said refiner having at least one rotating plate element and a second plate element at a fixed distance from and in facing relation to said one rotating element to reduce the length of said fibers, said fixed distance being substantially less than the lengths of a major quantity of said fibers and greater than the size of said shot and subjecting said refined fibers to the action of a separator whereby fibers with said preselected narrow range of aspect ratios are produced with less than 1% shot.

2. The method of producing inorganic fibers having a preselected range of aspect ratios comprising the steps set forth in claim 1 in which said mass of fibers is moved in a generally spiral path.

3. The method of producing inorganic fibers having a preselected range of aspect ratios comprising the steps set forth in claim 2, and the step of applying a forward linear force component to said fibers simultaneously with said spiral path movement.

* * * * *